United States Patent [19]
Bishop et al.

[11] Patent Number: 5,362,080
[45] Date of Patent: Nov. 8, 1994

[54] FRONT AND REAR WHEEL STEERING SYSTEMS

[75] Inventors: Arthur E. Bishop, Northwood; John Baxter, Chatswood, both of Australia

[73] Assignee: A. E. Bishop & Associates Pty Limited, North Ryde, Australia

[21] Appl. No.: 987,287

[22] PCT Filed: Sep. 18, 1991

[86] PCT No.: PCT/AU91/00433

§ 371 Date: Mar. 16, 1993

§ 102(e) Date: Mar. 16, 1993

[87] PCT Pub. No.: WO92/05062

PCT Pub. Date: Apr. 2, 1992

[30] Foreign Application Priority Data

Sep. 26, 1990 [AU] Australia .................. PK2518

[51] Int. Cl.$^5$ .................................. B62D 7/15
[52] U.S. Cl. ........................ 280/91; 180/140; 280/99
[58] Field of Search ............... 280/99, 91; 180/140

[56] References Cited

U.S. PATENT DOCUMENTS

| | | |
|---|---|---|
| 4,313,514 | 2/1982 | Furukawa et al. |
| 4,418,780 | 12/1983 | Ito et al. |
| 4,552,239 | 11/1985 | Kanazawa et al. ........ 180/140 |
| 4,572,316 | 2/1986 | Kanazawa et al. |
| 4,657,102 | 4/1987 | Kanazawa et al. |
| 4,660,844 | 4/1987 | Yamamoto et al. |
| 4,673,189 | 6/1987 | Kanazawa et al. ........ 280/91 |
| 4,730,839 | 3/1988 | Miyoshi |
| 4,733,878 | 3/1988 | Kanazawa et al. |
| 4,941,542 | 7/1990 | Tomoda et al. ........... 180/140 |
| 5,060,743 | 10/1991 | Oda et al. ................. 180/140 |

FOREIGN PATENT DOCUMENTS

| | | |
|---|---|---|
| 3338702A1 | 10/1983 | Germany. |
| 3837141A1 | 5/1989 | Germany. |
| 1-70272 | 3/1989 | Japan ..................... 280/91 |
| 2173460A | 10/1986 | United Kingdom. |

OTHER PUBLICATIONS

Patent Abstract from Japan: "Real Wheel Steering Device of Car"; vol. 13, No. 287 (M-844) (3635), Jun. 30, 1989.
Patent Abstract from Japan; "Rear-Wheel Steering Mechanism"; vol. 13, No. 318 (M-852) (3666), Jul. 19, 1989.
WO-A-9 106 464 (Gutierrez De Cepeda); Abstract; FIGS. 1, 2, 4.
"The Mazda Speed Sensing Computerised 4-Wheel Steering System", 4WS, Technical Information, pp. 1-13.
SAE-A Journal, "4WS on track for handling", Jul.-/Aug. 1989, p. 20.

*Primary Examiner*—Eric Culbreth
*Attorney, Agent, or Firm*—Nikaido, Marmelstein, Murray & Oram

[57] ABSTRACT

A mechanical function generating mechanism for a front and rear wheel steered vehicle is operable to generate a rear steer angle output as a function of front steer angle and vehicle speed inputs. The mechanism has a three dimensional cam with a cam surface and a contacting follower. The cam surface is traversed relative to the follower in a first direction in accordance with the front steer angle input and is traversed relative to the follower in a second direction substantially at right angles to the first direction according to the vehicle speed input. The follower is constrained to move in a third direction, determined by the shape of the cam surface, substantially normal to the first and second directions to generate the rear steer angle output.

10 Claims, 6 Drawing Sheets

FRONT AND REAR WHEEL STEERING SYSTEMS

TECHNICAL FIELD

The present invention relates to front and rear wheel steering systems for vehicles, commonly called Four Wheel Steering (4WS) systems, specifically "speed dependent" systems in which the magnitude and direction of the rear-steer is made to be a function of not only front steering angle but also vehicle speed and/or other related parameters.

BACKGROUND ART

Typically such systems provide that the rear wheels steer in the same direction as the front wheels in modes of operation associated with high vehicle speed, providing a sideshifting characteristic to the vehicle so that the same level of lateral acceleration response is achieved with a lesser degree of yawing. The resulting enhanced lateral response of the vehicle to steering wheel inputs gives the driver a sensation of stiffness and security, particularly in lane changing at high speeds. On the other hand some such systems provide that the rear wheels steer in opposite direction to the front wheels in modes of operation associated with low vehicle speed, providing an enhanced yaw response with consequential good maneuverability and minimum width of the "swept path" of the vehicle through corners. In this specification "swept path" is defined as the envelope of the vehicle's trajectory projected with respect to the road during a maneuver. The numerical ratio of rear steer angle to front steer angle, measured instantaneously over a small incremental range of these variables at a given vehicle speed, will be termed "rear/front steering ratio". This ratio is therefore the effective instantaneous slope of the rear steer angle function when plotted against front steer angle at a given vehicle speed. According to this definition, rear/front steering ratio is usually designed to be positive at high vehicle speeds and negative at low vehicle speeds. Also the term "on-center" will be used to describe the driving condition when the steering wheel is positioned in or around its central operating region, as associated with straight-ahead driving.

The optimum rear/front steering ratio for high-speed on-center driving has been found to be approximately 0.4. Ratios higher than 0.4, although further improving lane holding and lane changing during highway driving, lead to inadequate vehicle yaw response during negotiation of highway curves. Similarly the optimum rear/front steering ratio for low speed parking maneuvers has been found to be approximately −0.3. Values lower than −0.3 (for example −0.5 or −1.0), although providing excellent vehicle maneuverability, may cause the rear of the vehicle to "sweep-out" and rub against the curb in parking maneuvers. Non-experienced drivers find excessively low values of rear/front steering ratio difficult to master.

The additional major constraint on virtually all 4WS systems is that rear steer angles must be limited to about 5 degrees in order to avoid the rear wheels intruding into potential rear trunk compartment space. Although 5 degrees rear steer angle represents a practical limit in low speed maneuvering consistent with the aforementioned sweep-out problem during parking, 5 degrees rear steer angle will be extremely dangerous in high speed driving. In some prior art speed dependent 4WS systems, 5 degrees rear steer will inevitably occur for large magnitudes of steering wheel input because of the particular speed dependent reversing mechanisms employed. The design philosophy in this case is simply based on the fact that such large steer wheel angles will never be used in normal high speed driving. This is of course correct, however, in emergency evasive maneuvers at high speed, or recovery from skidding, large steering angles will often be necessary. In such critical driving situations it is essential that large rear steer angles do not occur in order that the response of the 4WS vehicle is not disconcerting to the average driver.

Mechanical sliding mechanisms such as disclosed in U.S. Pat. No. 4,313,514 (Honda), U.S. Pat. No. 4,552,239 (Mazda), and west German Patent 3,837,141 (ZF) maintain a constant rear/front steering ratio independent of front steer angle, for a given vehicle speed. In order to limit rear steer to the abovementioned 5 degrees for a typical maximum front steer angle of 36 degrees, such mechanisms must limit the rear/front steering ratio to about 0.14 (5/30). This, however, is still only 35% of the previously mentioned optimum on-center value of 0.4 at high speed and 47% of the allowable value of 0.3 at low speed and parking.

For this reason more sophisticated mechanisms have been developed which enable rear/front steering ratio to not only be varied as a function of vehicle speed but also, for any given speed, varied as a function of front steer angle. These mechanisms enable a higher rear/front steering ratio to be used on-center yet, by reducing this ratio towards full-lock, maintain the constraints previously described in respect to this ratio overall, hence limiting maximum rear steer angle. By way of example the mechanism disclosed in U.S. Pat. No. 4,572,316 (Mazda), and as used in the production of 1989 Mazda MX6 vehicle, incorporates a disk rotatably supported on a nutating axis, the inclination of this axis being actuated by stepper motor as a function of vehicle speed. The disk is inclinable either side of a central null position and drives a spool valve supported co-axially with its axis at this null position via a ball-jointed push rod connected to its outer periphery. Displacement of the spool valve activates the hydraulically assisted rear steer, providing the required positive rear/front steering ratio at high speed and negative ratio at low speed. A front steer angle causes the disk to rotate on its inclined axis giving a sinusoidal variation in rear/front steering ratio with a magnitude approximately proportional to the angle of inclination of the axis of the disk with respect to its null position. At the null position therefore zero rear steer occurs independent of any given front steer angle. The vehicle speed for which the resulting rear/front steering ratio is zero will be termed the "crossover speed" and is typically set at moderate speeds of about 30–50 km/h.

The above described sinusoidal variation results, for any given vehicle speed, in the rear/front steering ratio on-center being 1.57 times its mean (overall) value. Hence, for the data exampled earlier, during high speed driving an on-center rear/front steering ratio of 0.22 (1.57×5/36) could be provided while still limiting rear steer at maximum steering wheel input to 5 degrees. This value is still only 55% of the optimum value of 0.4.

Allowed U.S. Pat. application No. 07/849,369 (Bishop) overcomes this limitation of the nutating mechanism described in U.S. Pat. No. 4,572,316. In one embodiment of the invention disclosed in this Patent Application, a front-steer angle dependent function generating mechanism is shown which is in the form of a pin and slot device similar to one quadrant of a Geneva mechanism wherein the driving member rotates about an axis and carried a pin offset from that axis which engages a pivoted driven member having a radial slot. The ratio between the offset of the pin in the driving member and the radius at which the pin engages the slot of the driven member, with respect to its own axis, determines the basic characteristic of the mechanism. Such a device can provide a relationship between input and output which is non-sinusoidal having a maximum ratio say 3 times that of the mean overall ratio. In terms of the previously quoted example, the high speed on-center rear/front steering ratio can be raised to 0.42 (3×5/36) using this mechanism. Thus the optimum value of 0.40 can be provided. However, as in the case of the nutating mechanism shown in U.S. Pat. No. 4,572,316, large on-center rear/front steering ratios are only achieved at the expense of permitting unacceptably high rear steer angles (approaching 5 degrees) for high speed maneuvers requiring large steering wheel inputs. This represents a first disadvantage of such prior art mechanisms.

A swinging link mechanism is further described in U.S. Pat. application No. 07/849,369, this mechanism essentially being arranged in series with the abovementioned Geneva type front steer angle dependent function generating mechanism. Therefore, as in U.S. Pat. No. 4,572,316, the speed dependent function of the overall mechanism "scales" the magnitude of the front steer angle function which is basically a fixed relationship based on the geometry of the mechanism. Again a crossover speed exists for which the rear/front steering ratio is zero for all values of front steer angle.

The existence of a crossover speed for the function generating mechanisms disclosed in U.S. Pat. No. 4,572,316 and U.S. Pat. application No. 07/849,369 means that, in the region of this crossover speed (say 30–50 km/h) the performance of a 4WS system is little different to a traditional two wheel steering system. This is simply because only very small, if any, rear wheel steer angle is generated for a given front wheel steer angle for speeds in this range and represents a second disadvantage of such prior art mechanisms. Various attempts have been made to overcome this basic shortcoming. Mazda usually programs a rapid change in the speed dependent relationship through the crossover speed. In other words, the magnitude of the sinusoidal variation in rear/front steering ratio is quickly increased from a large negative value, through zero, to a large positive value as the vehicle accelerates through the crossover speed. Such a relationship for the Mazda MX6 vehicle has been disclosed in the publication SAE-Australasia Journal July/August 1989 and also in the Mazda technical publication "4WS - The Mazda Speed Sensing Computerized 4-Wheel Steering System Technical Information", Mazda Australia Pry Limited 1989. Such a very non-linear speed dependent relationship however leads to a corresponding very non-linear variation in vehicle yaw rate response through the crossover speed. Normally around these moderate speeds, a smooth and progressive increase in vehicle understeer would be expected by the average driver as vehicle speed increases.

Another technique proposed for making the crossover speed region of such systems less obvious to the driver is to purposely introduce hysteresis to the speed dependent relationship. This results in a differing crossover speed depending on whether a vehicle accelerates or decelerates through the crossover speed, or depending on different road conditions. Such concepts are disclosed in U.S. Pat. No. 4,730,839 (Mazda) and U.S. Pat. No. 4,733,878 (Honda). Numerous examples exist of concepts involving manually adjustable crossover speeds, purportedly to allow the driver to adjust the vehicle dynamics to suit his/her own subjective likes and dislikes, for example, U.S. Pat. No. 4,660,844 (Honda) and GB Patent 2,173,460 (Honda).

The above techniques however do not overcome the inherent disadvantage in prior art 4WS system design in which, at a certain crossover speed, zero rear steer angle occurs irrespective of front steer angle. Now it is well known in the art of automotive vehicle dynamics that, for a typical vehicle whose center of mass is biased toward the front of the vehicle, the vehicle yaw rate response as a function of steering wheel angle input decreases for increase in speed. This increasing understeer characteristic at increased speed for a given steering wheel input is typical for almost all commercially available cars and has a very deleterious effect on vehicle dynamics above about 0.3 g lateral acceleration due to the interaction between suspension design and tire characteristics. This understeering characteristic can lead inexperienced drivers to "run wide" in a turn or an emergency maneuver. Unlike in a two wheel steered vehicle, in a 4WS vehicle it is possible to counteract this characteristic at medium and high vehicle speeds by steering the rear wheels to generate a neutralizing (or partially neutralizing) oversteering trend at higher lateral accelerations.

In order to accomplish this in the region of crossover speeds (say 30–50 km/h) it is desirable that, even though zero rear wheel steer occurs for small steering wheel angles either side of on-center, for larger steering wheel angles associated with lateral accelerations of 0.3 g or more the rear wheels steer in the opposite direction to the front wheels. This progressive increase in negative rear/front steering ratio for higher lateral acceleration levels, up to some predetermined limit, will conveniently tend to counteract the undesirable progressively increasing understeer characteristic inherent in conventional vehicle dynamics due to the aforementioned suspension and tire characteristics. Taken a step further, the vehicle can even be made to exhibit a moderate oversteer characteristic as, for example, used by normal drivers in severe cornering or by experienced drivers when maneuvering through a marked slalom course. This handling characteristic will result in a much reduced width of swept path of the vehicle and consequently superior avoidance maneuver and slalom course performance.

A similar philosophy can be applied at vehicle speeds above the crossover speed where, in accordance with the above referred to prior art speed dependent 4WS systems, the rear/front steering ratio is positive for all front steer angles so reducing the vehicle yaw response. Thus the magnitude of this positive rear/front steering ratio could be decreased for higher lateral acceleration levels, as occurs in high speed cornering, in order to restore the yaw response of the vehicle to steering wheel inputs. For certain vehicles it may be advantageous to limit or even reduce rear steer angle, as a function of front steer angle, above a certain threshold front steer angle level. Limiting of rear steer angle has already been referred to as having advantages not only in terms of vehicle dynamics, as perceived by the driver, but also safety. U.S. Pat. No. 4,552,239 (Mazda) discloses this philosophy for vehicle speeds well above the crossover speed, that is for speeds at which the on-center rear/front steering ratio is much greater than zero. No disclosure is made in that patent regarding the rear steer philosophy that should be adopted for speeds in the region of the crossover speed or below this speed. Two embodiments are described in that patent: the first is a microprocessor driven electro-hydraulic system which is effectively "fly-by-wire" and, the second, the earlier referred to mechanical sliding mechanism. The first embodiment described may possibly be able to adhere to the rear steer philosophy disclosed but little teaching exists to this effect. However, as elaborated on later, such "fly-by-wire" systems are unlikely to be adopted in mass production vehicles in the near future for reasons of safety. The second embodiment described appears somewhat "out of place" since that relatively simple sliding mechanism cannot possibly adhere to the complex rear steer philosophy disclosed, in fact it would only be able to produce a constant rear/front steering ratio. Thus that mechanism inherently must possess a crossover speed for which zero rear steer occurs independent of front steer angle.

As stated earlier, the mechanisms disclosed in U.S. Pat. No. 4,572,316 or U.S. Pat. application No. 07/849,369 have the speed function generating mechanism arranged in series with the front steer angle function generating mechanism. Such compound mechanisms therefore necessarily produce a family of front steer/rear steer relationships which are "scaled replicas" as a function of vehicle speed. This third disadvantage of such prior art mechanisms is compounded by the fact that, at the crossover speed, this scale factor is necessarily zero in order to yield a zero rear/front steering ratio on-center. However this, by default, yields zero rear steer angle for any front steer angle at the crossover speed which is clearly, as stated above, a suboptimal situation in terms of vehicle dynamic requirements. A fourth related disadvantage of such prior art mechanisms is that, for any given vehicle speed, the relationship between rear steer angle output and front steer angle input is a smooth, relatively simplistic, function. As seen, the nutating mechanism disclosed in U.S. Pat. No. 4,572,316 generates, basically, a sinusoidal relationship. The Geneva mechanism disclosed in U.S. Pat. application No. 07/849,369 offers a higher on-center rear/front steering ratio, but nevertheless is incapable of generating the earlier referred to compensation for the understeering characteristic of the vehicle.

It is, of course, possible to design a fully electrically actuated function generating system which would enable microprocessor control of numerous complex rear steer control strategies as a function of front steer angle and vehicle speed- Such systems are disclosed for example in U.S. Pat. No. 4,418,780 (Nissan), U.S. Pat. No. 4,552,239 (Mazda), U.S. Pat. No. 4,733,878 (Mazda) and GB Patent 2,173,460 (Honda), however their lack of commercial adoption most likely stems from the inherent dangers associated with having the rear steer Control effectively "fly-by-wire". Mechanically actuated hydraulic steering systems have an historically proven safety record in the area of conventional power assisted front steering of cars. It is commercially acceptable to use electrical actuation to provide the speed input to a speed dependent 4WS system, as shown in U.S. Pat. No. 4,572,316 and used in the Mazda MX6 vehicle, since even if through malfunctioning this input goes to maximum or zero, the vehicle still remains steerable.

In light of the current impracticality of electronically actuated function generating systems with regard to safety, and based on the above described disadvantages of prior art mechanically actuated function generating mechanisms, a mechanical function generating mechanism is proposed for which the front steer angle and vehicle speed, the two input variables, interactively combine to "calculate" the required rear steer angle, the output variable. Stated mathematically, these variables are not "independent" as far as the determination of rear steer angle is concerned. The relationship between front steer angle and rear steer angle at, say, a low speed of 10 km/h will not necessarily even resemble the general form of the relationship near the crossover speed of say 45 km/h, or indeed at high speeds of say 200 km/h. Such optimised interaction of these variables should ideally be available at all vehicles speeds. The optimum characteristic relating front and rear steer angle variables for any given vehicle speed, being derived from non-linear tire and suspension characteristics, will never be a straight-fine and will almost necessarily require re-entrancies. Thus the straight-line characteristics lacking re-entrancies, illustrated for example in U.S. Pat. No. 4,552,239 (Mazda), are suboptimal.

DISCLOSURE OF THE INVENTION

The present invention is aimed at ameliorating at least one of the disadvantages of prior art function generating systems and in one aspect consists in a function generating means for a front and rear wheel steered vehicle, said means being adapted to generate a rear steer angle output as a function of front steer angle and vehicle speed or speed equivalent inputs wherein for every value of said vehicle speed input there is at least one value of said front steer angle input for which the rear steer angle output is non-zero and there is at least one vehicle speed at which the rear/front steering ratio is substantially zero for low values of front steer angle associated with on-center driving and said ratio remaining substantially zero up to a first predetermined value of front steer angle characterised in that said ratio becomes negative at said at least one vehicle speed as the front steer angle is increased beyond said first predetermined value towards a second predetermined value.

As stated earlier, although an electronic function generating system can be designed by the addressee to produce the required functional relationship, a mechanical function generating mechanism is preferred for reasons of safety.

In another aspect the present invention provides a mechanical function generating mechanism for a front and rear wheel steered vehicle, said mechanism being adapted to generate a rear steer angle output as a function of front steer angle and vehicle speed or speed equivalent inputs characterised in that said mechanism comprises a three dimensional cam with a complex surface and a contacting follower, the complex surface being traversed relative to the follower in a first direction in accordance with said front steer angle input and being traversed relative to the follower in a second direction substantially at right angles to said first direction according to said vehicle speed input, the follower being constrained to move in a third direction, determined by the shape of the complex surface, substantially normal to said first and second directions so as to generate said rear steer angle output.

In order for the vehicle response to steering wheel inputs to be symmetrical in left and right-hand directions, the complex surface of said three dimensional cam comprises two zones relative to its motion in said first direction corresponding to front steer angle input, one of said zones being a mirror image of the other and lying on either side of a mid position line on said complex surface corresponding the steering wheel position when the vehicle is driven on-center.

The three dimensional cam may be traversed with respect to the follower in a rectilinear manner in two dimensions or, alternatively, may comprise a cylindrical drum cam member which is traversed rotationally, for example, with respect to front steer angle input and axially with respect to vehicle speed input. However, in a particularly preferred form the three dimensional cam is configured as a face cam which is rotated about an axis substantially normal to the plane of the complex surface wherein the follower is constrained to contact this surface at a radius varying according to the vehicle speed input.

Thus an especially preferred mechanical function generating mechanism comprises a face cam rotating on journals such that the axis of rotation is predominantly perpendicular to the plane of said face cam, the angle of rotation of the face cam being controlled by a front steer angle input wherein less than one revolution of the face cam occurs on its journals for rotation of the front wheels between left-lock and right-lock, a cam follower maintained in contact with three dimensional surface undulations on said face cam by spring biasing or desmodromic means, said cam follower being supported on a follower arm which is rotationally and slideably supported in journals with axes substantially parallel to said axis of rotation of said face cam, rotation of said follower arm in said journals being controlled by a vehicle speed input such that for high vehicle speeds contact between said cam follower and said surface of said face cam occurs at a relatively large radius with respect to said axis of rotation of said face cam, and at low vehicle speeds said contact occurs at a relatively smaller radius, traversing of said cam follower over said surface undulations of said face cam affecting axial sliding of said follower arm in said journals, and wherein the position of said cam follower corresponds to a rear steer angle output which is a function of said front steer angle and vehicle speed inputs.

The rear steer angle output from the described embodiment of a mechanical function generating mechanism is in the form of an axial displacement of the follower arm in its journals. In theory this axial displacement could be used to drive the rear steer angle directly via a purely mechanical linkage, however, in practice, this is unlikely since space constraints will limit the physical size of the face cam to perhaps 125 mm diameter, hence the axial travel of the follower arm will be perhaps a maximum of say 10 mm. The preferred form of incorporation of such a mechanical function generating mechanism into a 4WS system is to integrate this mechanism into a hydraulically assisted rear steer controller. Such a controller has been disclosed in U.S Pat. application No. 07/849,369.

Thus a rear steer controller may be incorporated into a conventional front wheel steering gear by integrating a face cam mechanical function generating mechanism as described and a servo device. The servo device may incorporate an open-center hydraulic 4-way spool-valve which serves to direct hydraulic fluid into a rear steering actuator via two hydraulic lines. In preferred form the rear steering actuator is a hydraulic cylinder lying across the rear of the vehicle with tie rods extending from each side of the cylinder and connected to the steerable rear wheels. A low force level signal transmitter, consisting of a flexible push-pull wire contained in an outer tube, provides feedback of the rear-wheel actual position to null the servo-valve via a "floating link" differential device also incorporated in the rear steer controller. The hydraulic circuit and details of the method of operation of this system is more fully described in Australian Patent Application PJ7201. The net effect, however, is that the face cam function generating mechanism embodiment transmits minimal force, hence can be relatively light in construction and consequently contribute little friction to the control system, while providing a complete functional flexibility in the design of a 4WS system enabling optimization of the vehicle dynamics under all driving conditions.

Different aspects of preferred forms of the invention will now be described by way of example with reference to the accompanying drawings, in which:

BEST MODES

Figure 1:
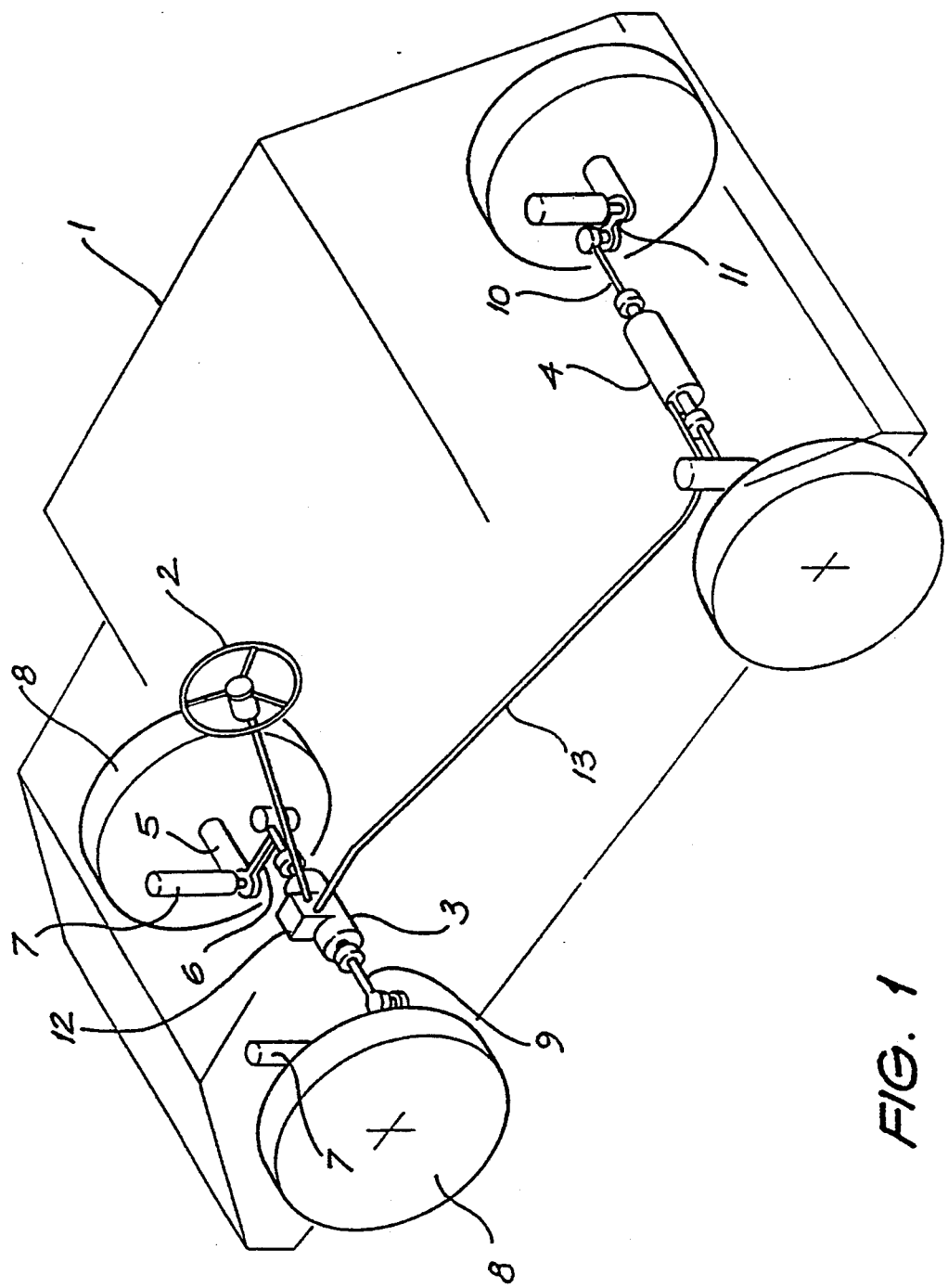
FIG. 1 is a general arrangement isometric view of a vehicle incorporating an embodiment of the invention.

FIG. 1 shows a vehicle 1 having a steering wheel 2 connected to a front steering gear 3 of the rack and pinion type and a rear steering actuator 4. Front wheels 8 are journalled on axles 5 which are secured to the lower end of McPherson struts 7 and carry steering radius arms 6 extending towards the rear of the car. To the ball end of these steering radius arms are attached tie rods 9 of front steering gear 3. Similarly, in the case of rear steering actuator 4, corresponding tie rods 10 extend to radius arms 11. The front steering gear 3 incorporates a rear-steer controller 12 and extending from this rear-steer controller 12 is control conduit Now referring to FIG. 2, steering wheel 2 drives input-shaft 14 of rotary power steering valve 15, hence rotating pinion 16 and axially sliding rack 17 connected to tie rods 9. Thus the driver's front steer angle input is provided to the front wheels 8 in the normal fashion consistent with most power assisted front wheel steering systems on the market today.

However input-shaft 14 incorporates gear 18 which meshes with contrate gear teeth 19 formed on the outer periphery of a face cam 20. A face cam arrangement is used in the first embodiment of a mechanical function generating mechanism in accordance with the present invention. The pitch radii of gear 18 and contrate gear teeth 19 are designed such that less than one revolution of face cam 20 occurs on its journals 21 for rotation of the front wheels 8 between left-lock and right-lock. In the embodiment described here, it will be assumed that 3 turns left-lock to right-lock at steering wheel 2 causes −36 degrees front steer angle, that is an overall front steering ratio of 15:1. If face cam 20 is designed to correspondingly rotate through +/−165 degrees, this means that the mechanical ratio of gear 18 and contrate gear teeth 19 is approximately 3.3:1. For practical reasons of assembly, the diameter of gear 18 will be limited to the approximate outer diameter of rotary valve 15, about 38 mm according to normal practice. Therefore, without including the complexity of additional intermediate gearing, the practical maximum outside diameter of face cam 20 is about 125 mm.

Cam follower 22, in the form of a spherical roller, is supported on follower arm 23, in turn mounted on shaft 24 which is rotatably and slideably journalled in the housing 25 of the rear steer controller 12 at journals 26 and 27. Cam follower 22 is urged against the three dimensional surface undulations on face cam 20 by opposing follower arm 28 with spherical friction tip 29. Opposing follower arm 28 is slideably journalled to shaft 24 but prevented from relative rotation by keyway arrangement 30. Hence spherical friction tip 29 always is made to contact face cam 20 at a point immediately on the opposite side of the face cam to cam follower 22. The opposing reaction force is produced by helical compression spring 31, preloaded between opposing follower arm 28 and seat 32, fixed to shaft 24.

A front steer angle input resulting from rotation of steering wheel 2 therefore also rotates face cam 20. Follower 22 follows the three dimensional undulations on face cam 20 and causes shaft 24 to displace axially in journals 26 and 27, resulting in an appropriate rear steer angle output signal as axial displacement 33.

However, using a hydraulic circuit disclosed in U.S. Pat. application No. 07/849,369 a hydraulic pressure signal can be generated which varies in magnitude as a function of vehicle speed. This pressure signal is applied via hydraulic connection 34 to one side of cylinder 35 containing piston 36 and reaction spring 37, hence producing a proportional displacement of piston rod 38 extending outside cylinder 35. Slotted plate 39 is mounted on the end of piston rod 38 and drives pin 40 mounted to follower arm 23. Variation of the pressure signal at hydraulic connection 34 therefore causes rotation of shaft 24 in Journals 26 and 27 (shown for clarity as rotational displacement 41), hence causing follower 22 to contact face cam 20 at differing radial positions.

Figure 3:
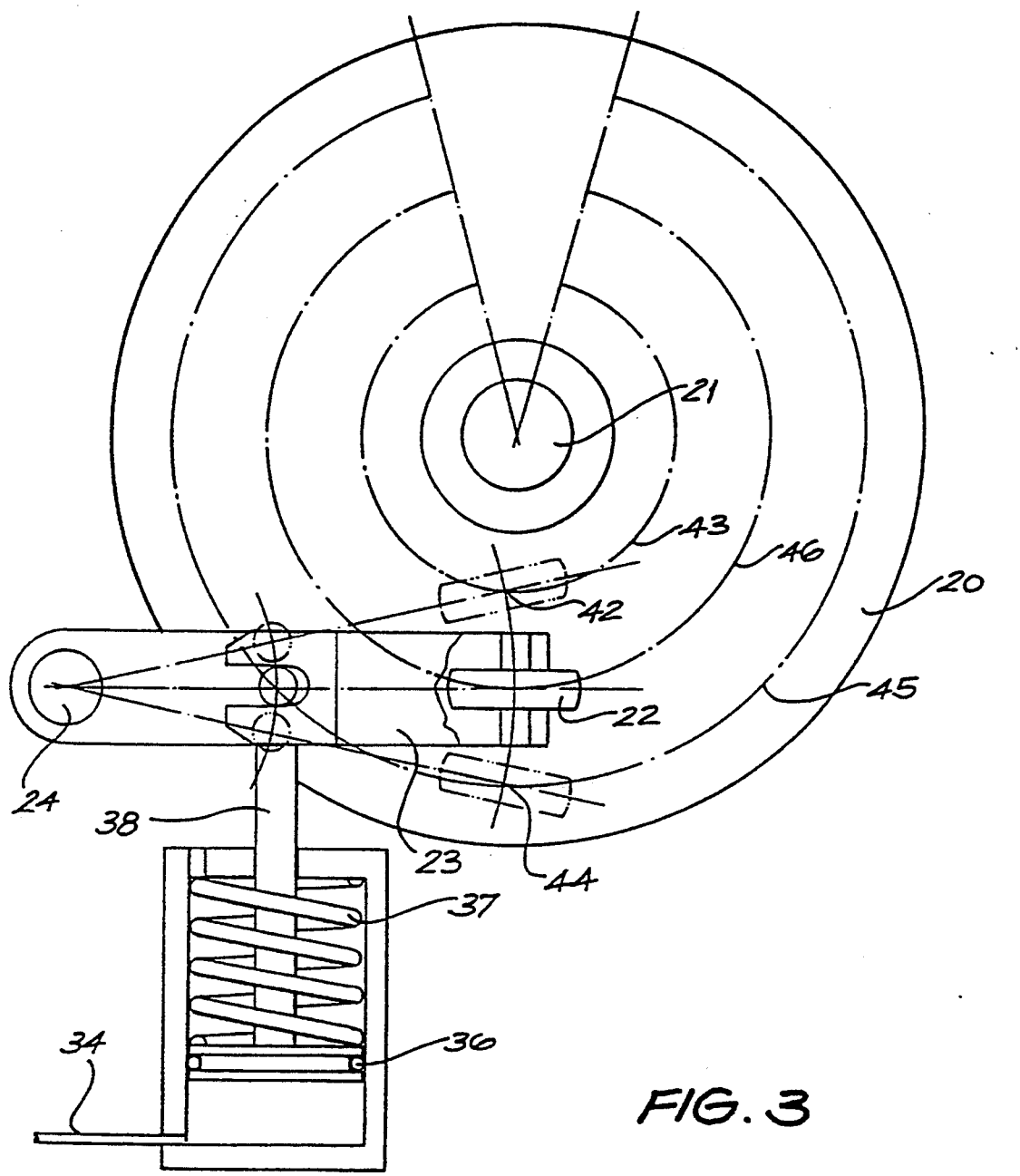
FIG. 3 is a view of the face cam of the mechanical function generating mechanism of FIG. 2 parallel to its rotational axis.

This action is more clearly shown in FIG. 3 wherein it is seen that a high magnitude of pressure signal at hydraulic connection 34 will displace piston rod 38 upwards causing follower 22 to contact face cam 20 at point 42 and follow a path 43 of lesser radius on face cam 20 as the driver makes front steer angle inputs. Alternatively a low magnitude of pressure signal at hydraulic connection 34 will displace piston rod 38 downwards causing follower 22 to contact face cam 20 at point 44 and follow a path 45 of larger radius on face cam 20 as the driver makes front steer angle inputs. Consistent with the practice used in U.S. Pat. application No. 07/849,369, a high magnitude of pressure signal at hydraulic connection 34 will correspond to zero vehicle speed, that is parking type maneuvers, and a low magnitude of pressure signal at hydraulic connection 34 will correspond to maximum vehicle speed.

In this manner cam follower 22 follows an infinite set of different paths on face cam 20 as a function of vehicle speed input. For example path 43 during low speed parking maneuvers, path 46 at moderate speeds of, say, 40 km/h and path 45 at high speeds of, say, 100 km/h. Since the undulations on face cam 20 can be arranged to be of entirely different form at differing radii, a rear steer angle output signal corresponding to axial displacement 33 can be generated which is an arbitrary function of the two independent input variables of front steer angle, and vehicle speed. The former input variable causes rotation of face cam 20 and the latter causes follower 22 to follow face cam 20 along differing radial paths.

The second half of the rear steer controller, the servo device, amplifies the low force amplitudes associated with the rear steer angle output, that is axial displacement 33. Returning to FIG. 2, it can be seen that the servo device is similar to that previously described in U.S. Pat. application No. 07/849,369.

Figure 4:
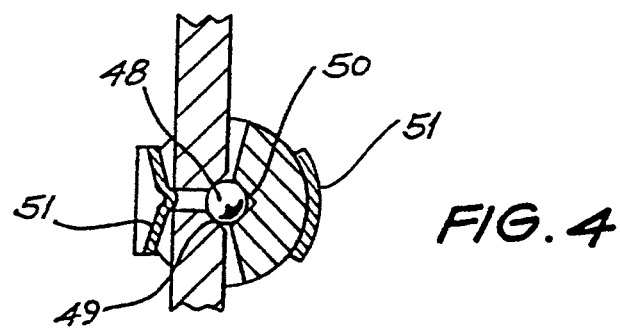
FIG. 4 is a detailed cross-sectional view of the slack free support for the floating link of the embodiment shown in FIG. 2.

Axial displacement 33 of shaft 24 is transmitted to floating link 47 by ball 48, as shown in cross-section in FIG. 4. Ball 48 is retained in conical recesses 49 and 50 in floating link 47 and shaft 24 respectively, and the assembly secured by spring clip 51. The use of ball 48 provides transmission of axial displacement 33 to floating link 47 without backlash and yet also allows floating link 7 to rotate about this center in a vertical plane. It also permits free rotational displacement 41 of shaft 24 which, as previously described, occurs as a function of vehicle speed.

An initial axial displacement 33 of shaft 24 causes rotation of floating link 47 about center 52 producing an axial displacement 54 at spool 53 which is approximately twice the magnitude of axial displacement 33 for the proportions shown in FIG. 3. Hydraulic fluid from a constant flow rate source enters feed port 55 and, consistent with this conventional open-center 4-way spool-valve arrangement, returns to reservoir via return port 56, in the process developing a differential pressure between left-cylinder communication port 57 and right-cylinder communication port 58. The magnitude of this differential pressure will be a function of the magnitude of axial displacement 54 of spool 53.

Figure 2:
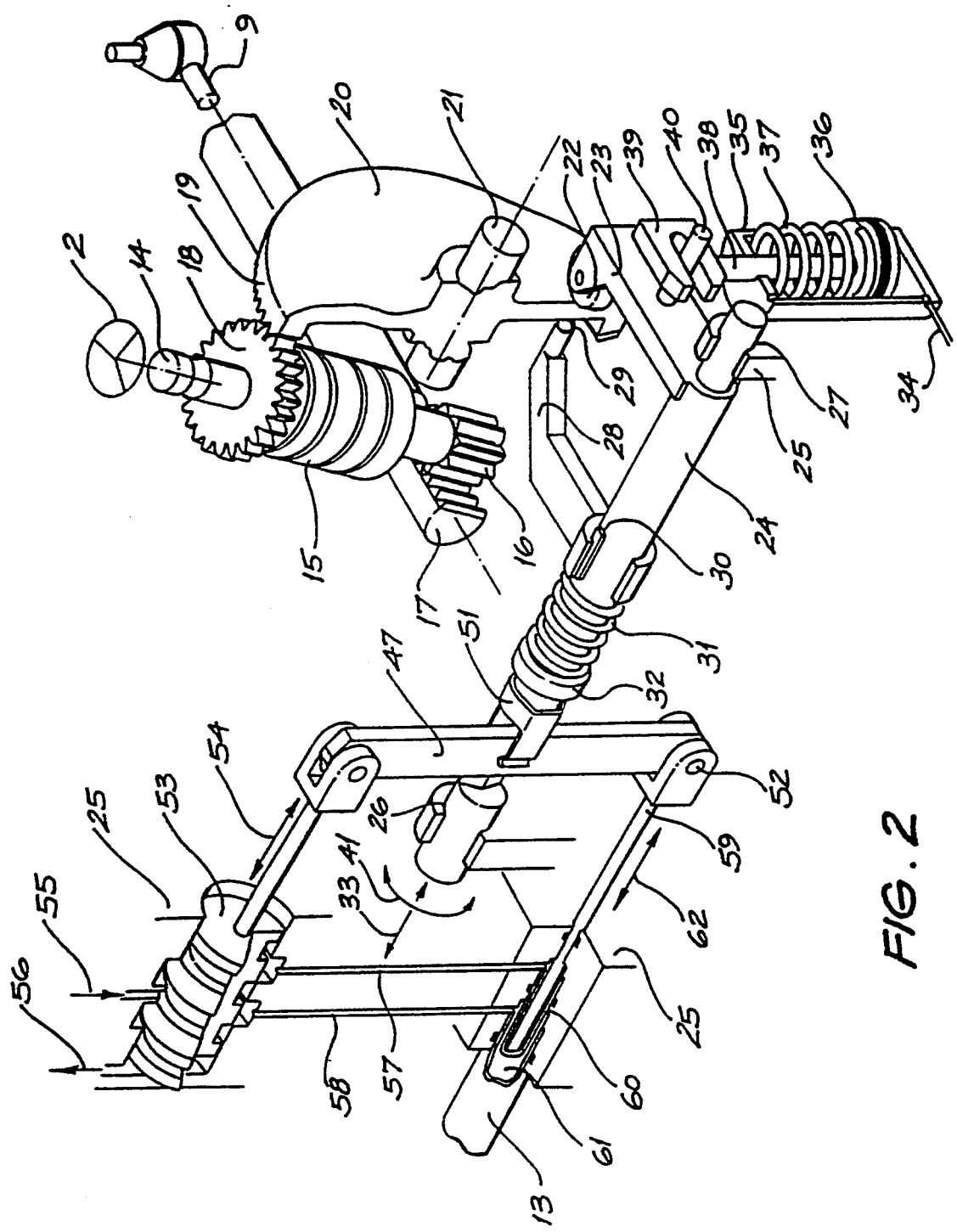
FIG. 2 is a general arrangement isometric view of a rear steer controller similar to that shown in FIG. 9 of U.S. Pat. application No. 07/849,369 but incorporating a first embodiment of a mechanical function generating mechanism in accordance with the present invention.

As disclosed in U.S. Pat. application No. 07/849,369, the preferred form of control conduit 13 is a concentric arrangement shown in FIG. 2 in which a flexible wire 59 is housed within left hydraulic tube 60 which itself is housed within right steer hydraulic tube 61. Hydraulic tubes 60 and 61 respectively connect to the left-and-right-hand sides of rear steer actuator 4 while flexible wire 59 provides feedback of the rear steer angle actual position to the rear steer controller as axial displacement 62. This causes floating link 47 to rotate about its center at ball 48, producing an opposite axial displacement 54 of spool 53 to that which originally offset the spool-valve, hence nulling the spool-valve and causing zero differential pressure to occur between communication ports 57 and 58 and hence at rear steer actuator 4.

In this manner the servo device amplifies the rear steer angle output signal (axial displacement 33) produced by the face cam function generating mechanism 5 and drives rear steer actuator 4 with 100% power assistance. Negligible force is transmitted through the function generating mechanism which can therefore be of light construction. Ideally face cam 20 could be injection moulded in plastic enabling accurate yet low cost reproduction of its complex three dimensional form.

Figure 5:
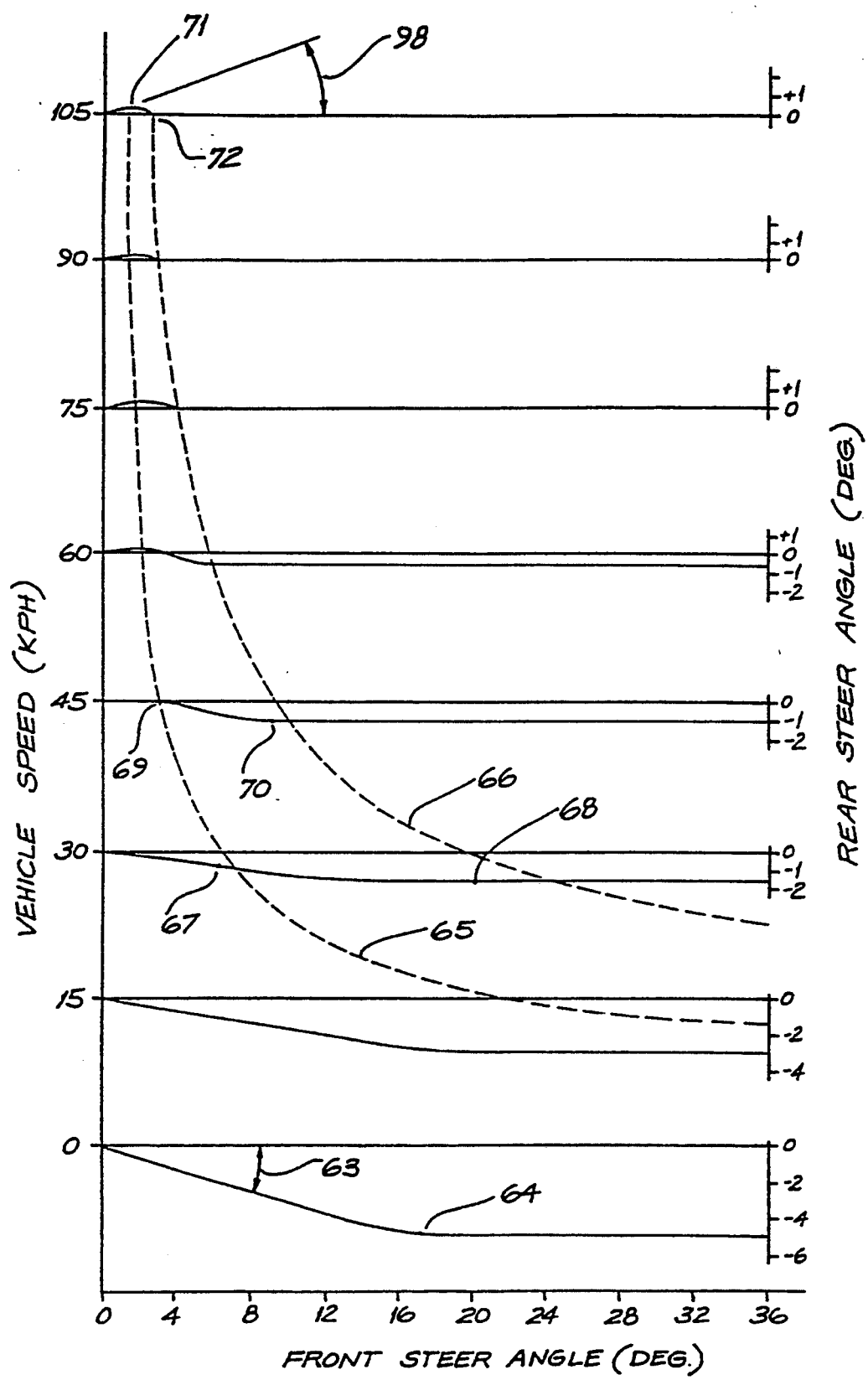
FIG. 5 is a series of graphs at different vehicle speeds indicating the ideal relationship between rear and front steer angles for a particular vehicle.

One embodiment of the form of face cam 20 will now be described. FIG. 5 shows a family of rear steer angle versus front steer relationships as a function of vehicle speed. At zero vehicle speed, that is parking maneuvers, it can be seen that the optimum rear/front steering ratio of −0.3 is used on-center as referred to earlier. Thus, angle 63 is 16.7 degrees (=arctan 0.3). This ratio is maintained up to a front steer angle of about 17 degrees at point 64 where the rear steer angle smoothly approaches a constant value of −5 degrees to limit trunk compartment intrusion of the rear wheels. To use an on-center rear/front steering ratio less than −0.3 (for example −0.5 or −1.0) would further improve the maneuverability of the vehicle at these very low speeds but also it would be very hard for the non-experienced driver to master. In practice it would be difficult to avoid "wiping" the rear wheel against the curb in a parking maneuver.

As vehicle speed increases, the on-center rear/front steering ratio is progressively increased from the aforesaid negative value of −0.3 up to a zero value at the crossover speed of 45 km/h and continues increasing as a positive value up to a maximum of 0.4 at a speed of 105 km/h. The philosophy adopted in shaping these curves may be, for example, that for any vehicle speed, the rear/front steering ratio will be maintained constant up to a vehicle lateral acceleration of 0.3 g corresponding to hyperbolic line 65. This maintains a linear vehicle response for steering wheel input since the tire characteristics are known to be approximately linear below vehicle lateral accelerations of 0.3 g. For vehicle speeds below the crossover speed, in this case 45 km/h, rear steer angle is then smoothly saturated to a value which, based on experience, is considered safe at the appropriate speed. For vehicle speeds higher than the crossover speed rear steer angle is reduced for vehicle lateral accelerations greater than 0.3 g in order to counter the aforementioned natural understeering characteristic of the vehicle at these higher speeds due to nonlinearities in the tire characteristics. For vehicle lateral accelerations that are apparently greater than about 1.0 g corresponding to hyperbolic line 66 rear steer angle is again made to smoothly approach a constant value since, as stated earlier, it is desirable to limit rear steer angles to values which, based on experience, are considered safe at the appropriate speed. The region of FIG. 5 to the right of hyperbolic line 66 does not necessarily correspond to lateral accelerations higher than 1.0 g, since this is impossible for most conventional vehicles. Rather this region corresponds to a "reversed steering lock" situation as would be likely to occur on unsealed road surfaces during rally driving.

Thus, for example, at a speed of 30 km/h, 0.3 g lateral acceleration is achieved at point 67 where the front steer angle is about 7.0 degrees and the rear steer angle is about −0.8 degrees. For steering angles greater than that corresponding to point 67, the rear/front steering ratio is progressively increased from its on-center value of say −0.12 such that beyond point 68, corresponding to a front steer angle of 16 degrees and a rear steer angle of −1.5 degrees, no further rear steer occurs. For this case at 30 km/h, 1.5 degrees has been chosen based on experience as the maximum safe operating angle for the rear steering.

At the crossover speed of 45 km/h, zero rear steer angle is used up to 0.3 g vehicle lateral acceleration corresponding to point 69 beyond which the rear wheels steer in an opposite direction to the front wheels up to point 70 corresponding to 1.0 g vehicle lateral acceleration where the front steer angle is 9.0 degrees and the rear steer angle is −1.0 degrees. This negative rear/front steering ratio for lateral acceleration levels between 0.3 g and 1.0 g will counteract the natural increase in understeer characteristic inherent in the vehicle dynamics due to the nonlinear tire characteristics and significantly reduce the width of the swept path of the vehicle in such maneuvers. Again, beyond point 70 at 1.0 g vehicle lateral acceleration, rear steer angle saturates at −1.0 degrees.

At a speed of 105 km/h, being well above the crossover speed, a positive constant rear/front steering ratio of 0.4 is employed up to a vehicle lateral acceleration of 0.3 g at point 71. Thus angle 98 is 21.8 degrees (=arctan 0.4) however the magnitude of this ratio is reduced for higher lateral acceleration levels to linearize the vehicle yaw response. Beyond point 72, corresponding to 2.4 degrees front steer angle and a vehicle lateral acceleration of 1.0 g, zero rear steer angle is employed. This optimum high speed characteristic, in this case, is held constant for speeds greater than 105 km/h.

The experienced driver, when cornering in a conventional 2WS vehicle, often causes the vehicle to assume an over-steer position by increasing the slip angle of the rear tires by several degrees through the application of the accelerator, which is a complicated maneuver permitting no error to the driver. The over-steer thus induced depends on tire inflation pressures, vehicle loading, road adhesion and many other variables. As can be seen, according to the invention, for vehicle speeds in the region of the cross over speed and above the rear wheels are steered to achieve a similar result but in an entirely controlled manner and at a lesser lateral acceleration. The enhanced cornering performance is thus made available to a normal driver without incurring risk of loss of control.

Figure 6:
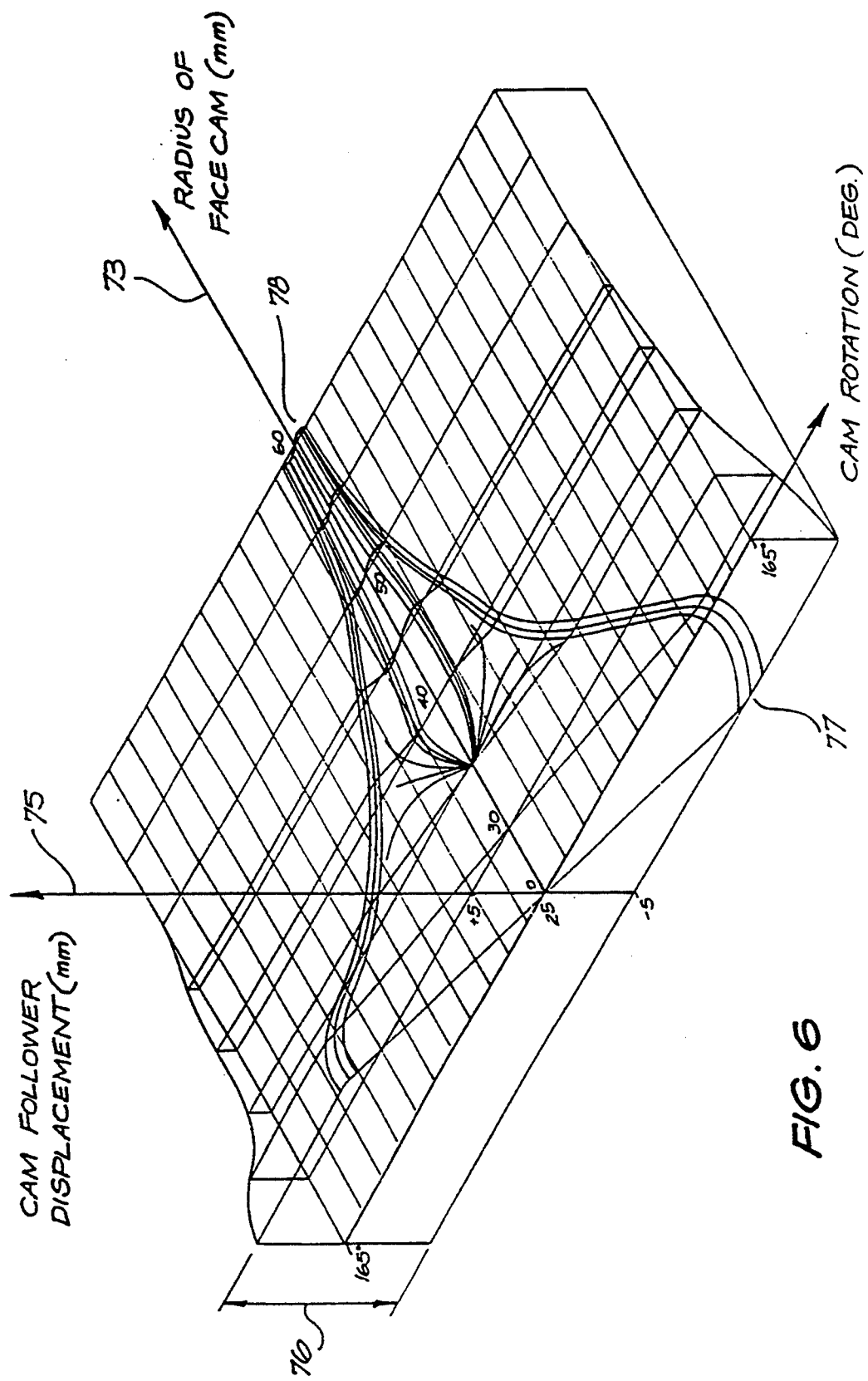
FIG. 6 is an isometric view of the form of the three dimensional surface undulations on the face cam of FIG. 3. For clarity, polar coordinates on the actual cam have been converted to rectangular coordinates in this isometric view.

In FIG. 6 the family of rear steer versus front steer curves shown in FIG. 5 are transformed into a three dimensional face cam surface. For clarity, polar coordinates on the actual cam have been converted to rectangular coordinates in this isometric view. Hence axis 73 shown as "Radius of Face Cam" actually extends radially from the rotational axis 21 of the face cam. Cam follower 22 (in FIG. 2) can be seen to contact face cam 20 at a radius of 25 mm during parking and at a radius of 60 mm at high speed. Typically this axis will saturate at a vehicle speed of say 105 km/h. Hence, above this speed, follower 22 will contact face cam 20 at a constant 60 mm and the rear steer versus front steer relationship will remain fixed.

In order to allow cam follower 22 to be of a practical diameter (say minimum 12 mm) and still permit features of the required functional relationship to be accurately reproduced, the rise 76 of the face cam 20 must be limited in the direction of axis 75 shown as "Cam Follower Displacement". Excessive rise on the cam will cause cam follower 22 to "undercut" the surface causing loss of functional fidelity. For the face cam shown in this example, rise 76 has been limited to 10 mm as shown. Cam feature 77 which cam follower 22 traverses during parking is relatively coarse when compared to the fine detailed cam feature 78 which is traversed at high vehicle speed. Hence cam feature 78 is more critical as far as the above referred to undercut problem is concerned. Placing this fine detailed feature at a large radius on face cam 20 minimizes this undercut problem since a tangential displacement of face cam 20 resulting from a given rotation on axis 21 will be 2.4 times larger at a radius of 60 mm at the outside of the face cam compared to a radius of 25 mm at the inside of the face cam.

Figure 7:
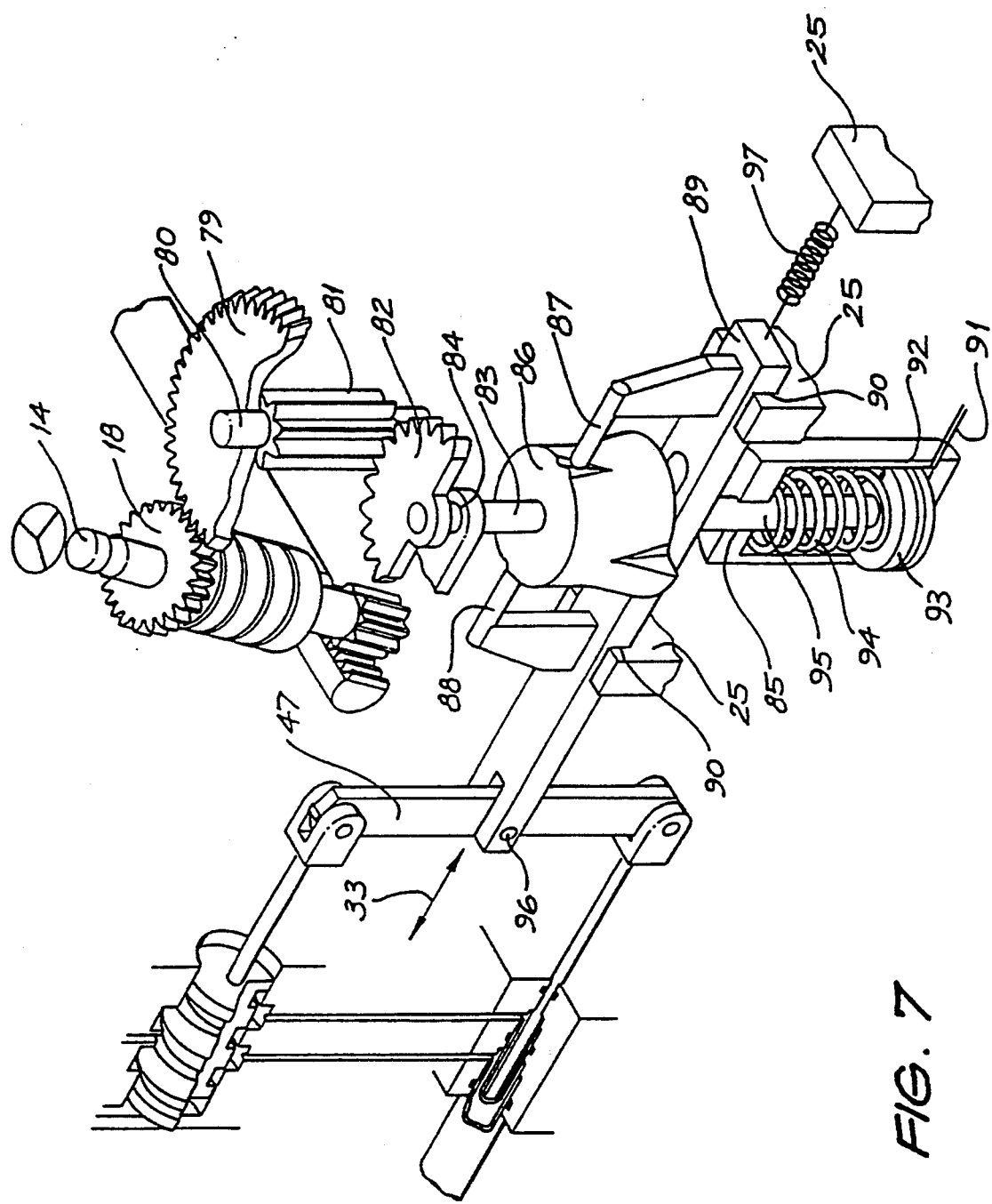
FIG. 7 is a general arrangement isometric view of a rear steer controller similar to that shown in FIG. 9 of U.S. Pat. application No. 07/849,369 but incorporating a second embodiment of a mechanical function generating mechanism in accordance with the present invention.

A second embodiment of a mechanical function generating mechanism in accordance with the present invention will now be described in which the face cam arrangement is substituted with a drum cam. Referring to FIG. 7, gear 18 on input-shaft 14 drives gear 79 on layshaft 80 having thereon pinion 81 which drives part gear 82 on shaft 83. However shaft 83 is extended and is carried in journals 84 and 85 so that it can both rotate and slide axially. For this purpose pinion 81 is extended axially so that it will always be maintained in mesh with part gear 82. Shaft 83 carries three dimensional drum cam 86 arranged for rotation through 90 degrees each way from the on-center position of the steering system illustrated. Therefore, assuming that the total travel of the steering wheel is 3 turns left-lock to right-lock, the overall gear ratio between input-shaft 14 and shaft 83 will be 6:1(540/90).

Desmodromic cam followers 87 and 88 have hemispherical contact faces which contact the three dimensional surface undulations of drum cam 86. Cam followers 87 and 88 are rigidly secured to slider 89 which is journalled for sliding on track 90 in housing 25 of the rear steer controller 12.

A speed dependent hydraulic pressure signal, similar to that employed for the case of the face cam arrangement in FIG. 2, is applied via hydraulic connection 91 to one side of cylinder 92 containing piston 93 and reaction spring 94, hence producing a proportional displacement of piston rod 95 integral with shaft 83. Axial displacement of shaft 83 in journals 84 and 85, and hence axial displacement of drum cam 86, is proportional to the magnitude of the speed dependent hydraulic pressure signal, and causes cam followers 87 and 88 to contact drum cam 86 in different axial planes as a function of vehicle speed.

Slider 89 is connected to floating link 47 at pivot 96 and hence, as cam followers 87 and 88 trace the three dimensional surface undulations on drum cam 86, the corresponding axial displacement 33 of slider 89 drives floating link 47, producing a rear steer output via the servo device which is a function of front steering angle and vehicle speed inputs. The desmodromic arrangement of cam followers 87 and 88 ensures that slider 89 is driven in both directions positively. Any small degree of backlash inherent in such an arrangement is readily removed by bias spring 97.

The actual geometry of the three dimensional surface undulations on drum cam 86 can be easily visualized from FIG. 6 except, in this case, axis 73 of this three dimensional map now corresponds to the axial position of drum cam 86. It can be appreciated therefore that an appropriate geometric form of drum cam 86 can be chosen to yield an identical functional relationship to that generated by the face cam embodiment in FIG. 2.

Further, it will be well understood by the addressee that a 3-D cam arrangement in accordance with another embodiment could be of the actual form shown by FIG. 6 rather than FIG. 6 being a mere visualisation or mapping of a drum cam. In this latter case the three dimensional cam is traversed with respect to the follower in essentially two dimensions.

As stated earlier, and as would be known to people knowledgeable in the art, it is theoretically possible that rear steer output signal from a mechanical function generating mechanism can be used to drive the rear steering system directly, that is, without the hydraulic assistance such as provided by the servo device described in U.S. Pat. application No. 07/849,369. For reasons already discussed, the face cam or drum cam embodiments in such an arrangement would most likely need to be much larger in diameter and more robust in design, in order to transmit significantly larger forces to the rear steering gear. For example, in the absence of the hydraulic pressure signal (as applied to cylinder 35 in FIG. 2), rotation of follower arm 23 could be actuated by stepper motor as a function of an electronically processed vehicle speed signal.

We claim:

1. A mechanical function generating mechanism for a front and rear wheel steered vehicle, said mechanism being operable to generate a rear steer angle output as a function of front steer angle and vehicle speed inputs, wherein said mechanism comprises a three dimensional cam with a cam surface and a contacting follower, the cam surface being traversed relative to the follower in a first direction in accordance with said front steer angle input and being traversed relative to the follower in a second direction substantially at right angles to said first direction according to said vehicle speed input, the follower being constrained to move in a third direction, determined by the shape of the cam surface, substantially normal to said first and second directions so as to generate said rear steer angle output.

2. A function generating mechanism as claimed in claim 1 wherein said cam surface of said three dimensional cam comprises two zones relative to its motion in said first direction corresponding to front steer angle input, one of said zones being a mirror image of the other and lying on either side of a mid position line on said cam surface corresponding to the steering wheel position when the vehicle is driven on-center.

3. A function generating mechanism as claimed in claim 1 wherein said three dimensional cam is traversed with respect to said follower in a rectilinear manner in essentially two dimensions.

4. A function generating mechanism as claimed in claim 1 wherein the three dimensional cam comprises a cylindrical drum cam member which is traversed rotationally and axially with respect to said follower.

5. A function generating mechanism as claimed in claim 4, wherein said drum cam member is journalled for rotational and axial movement, comprising geared coupling means between said drum cam and the steering wheel for rotating said drum cam, and means for varying the axial displacement of said drum cam according to vehicle speed.

6. A function generating mechanism as claimed in claim 1 wherein the three dimensional cam comprises a face cam rotatable about an axis substantially normal to the plane of the cam surface wherein the follower is constrained to contact the surface at a radius varying according to vehicle speed.

7. A function generating mechanism as claimed in claim 6, wherein the angle of rotation of said face cam is controlled by a front steer angle input such that less than one revolution of said face cam corresponds to the rotation of the front wheels between left-lock and right-lock, the cam follower is maintained in contact with the three dimensional surface of said face cam and supported on a follower arm, said follower arm being supported for rotation and axial sliding in journals having an axis substantially parallel to said axis of rotation of said face cam, drive means for rotating said follower arm in said journals according to vehicle speed-so as to vary the radial position of the follower with respect to the axis of the face cam, axial sliding of said follower arm in said journals resulting from traversing of said cam follower over said surface of said face cam, and whereby the axial position of said cam follower determines a rear steer angle output as a function of front steer angle and vehicle speed.

8. A function generating mechanism as claimed in claim 1 when integrated into a hydraulically or electrically assisted rear steer controller.

9. A function generating mechanism as claimed in claim 8 comprising a low force level signal transmitter consisting in a flexible push-pull wire adapted to provide feedback of the actual rear steer angle to null a servo via a differential device incorporated in the rear steer controller, said servo controlling a rear steer actuator.

10. A function generating mechanism as claimed in claim 1 wherein the rear steer angle output directly controls the rear steer angle via a mechanical linkage.

* * * * *